United States Patent [19]

McRae

[11] 4,270,817
[45] Jun. 2, 1981

[54] CASSETTE STORAGE AND DISPENSING DEVICE

[76] Inventor: William P. McRae, 22 Lincoln Court, Buena Park, Calif. 90620

[21] Appl. No.: 14,420

[22] Filed: Feb. 23, 1979

[51] Int. Cl.³ ............................................ A47B 81/06
[52] U.S. Cl. ........................................ 312/15; 312/18; 206/387
[58] Field of Search ................... 312/15, 9, 10, 11, 12, 312/13, 14, 17, 18, 19; 206/387

[56] References Cited

U.S. PATENT DOCUMENTS

| | | | |
|---|---|---|---|
| 1,033,014 | 7/1912 | Holstein | 312/15 |
| 1,258,498 | 3/1918 | Stuebing, Jr. et al. | 312/16 |
| 1,402,614 | 1/1922 | Hughes | 312/15 |
| 3,084,983 | 4/1963 | Stuart | 312/13 |
| 3,638,800 | 2/1972 | Frederick et al. | 312/9 |
| 3,811,745 | 5/1974 | Cylke | 312/13 |
| 3,866,990 | 2/1975 | McRae | 312/15 |
| 3,907,116 | 9/1975 | Wolf et al. | 206/387 |
| 3,969,007 | 7/1976 | Lowry | 312/15 |
| 4,046,255 | 9/1977 | Ackeret | 206/387 |
| 4,087,138 | 5/1978 | McRae | 312/15 |

FOREIGN PATENT DOCUMENTS 1503568 3/1978 United Kingdom .................... 312/9

Primary Examiner—Victor N. Sakran
Attorney, Agent, or Firm—Fulwider, Patton, Rieber, Lee & Utect

[57] ABSTRACT

A storage and dispensing cabinet in which films, tape cassettes or similar articles are stored in parallel open-ended slots. The cassettes are held in the slots and selectively ejected by an ejector mechanism formed by resilient retention members at the front ends of the slots and resilient drive members at the back ends of the slots, the retention and drive members being secured to a base that provides a raised platform on which the cassettes are supported. The retention members for the various slots are integrally formed as a single piece, the drive members being integrally formed in a similar manner, but separately from the retention members. When a cassette is to be ejected, the appropriate retention member is depressed, causing an abutment that normally engages the leading edge of the cassette to be withdrawn. The drive member then springs forward to its relaxed position, partially ejecting the cassette so that it can be withdrawn.

In another form of the invention, the slots extend horizontally and each retention member includes a lip along the bottom of an opening at the front of the slot. The retention member can be flexed downwardly to allow the stored article to pass over the lip as it is forced outwardly by a drive member. Alternatively, the article can be lifted above the lip, allowing the drive member to push it partially out of the slot.

7 Claims, 12 Drawing Figures

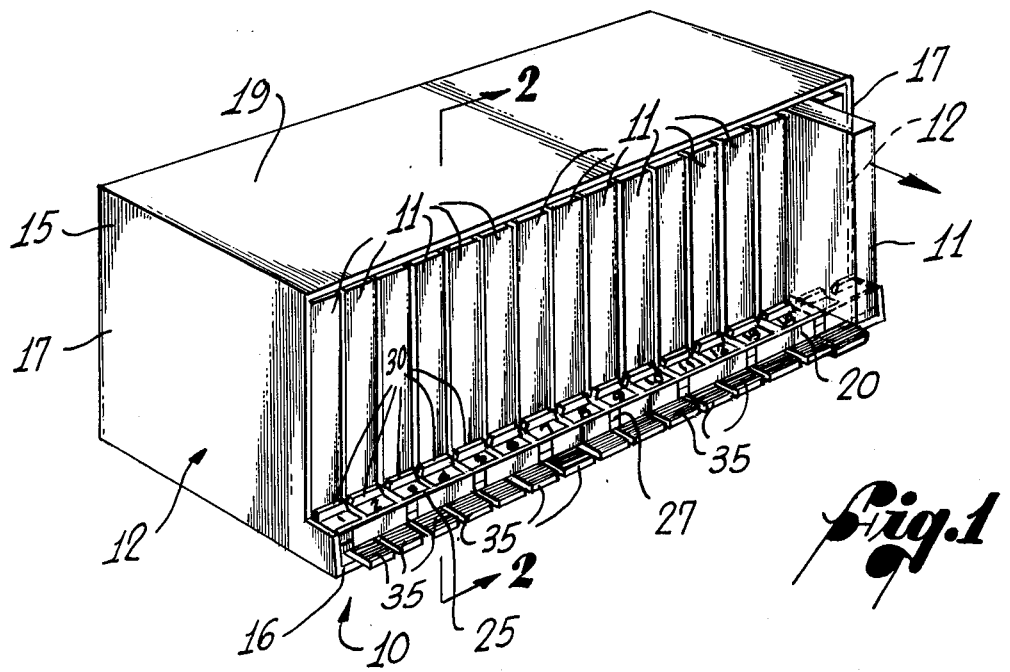
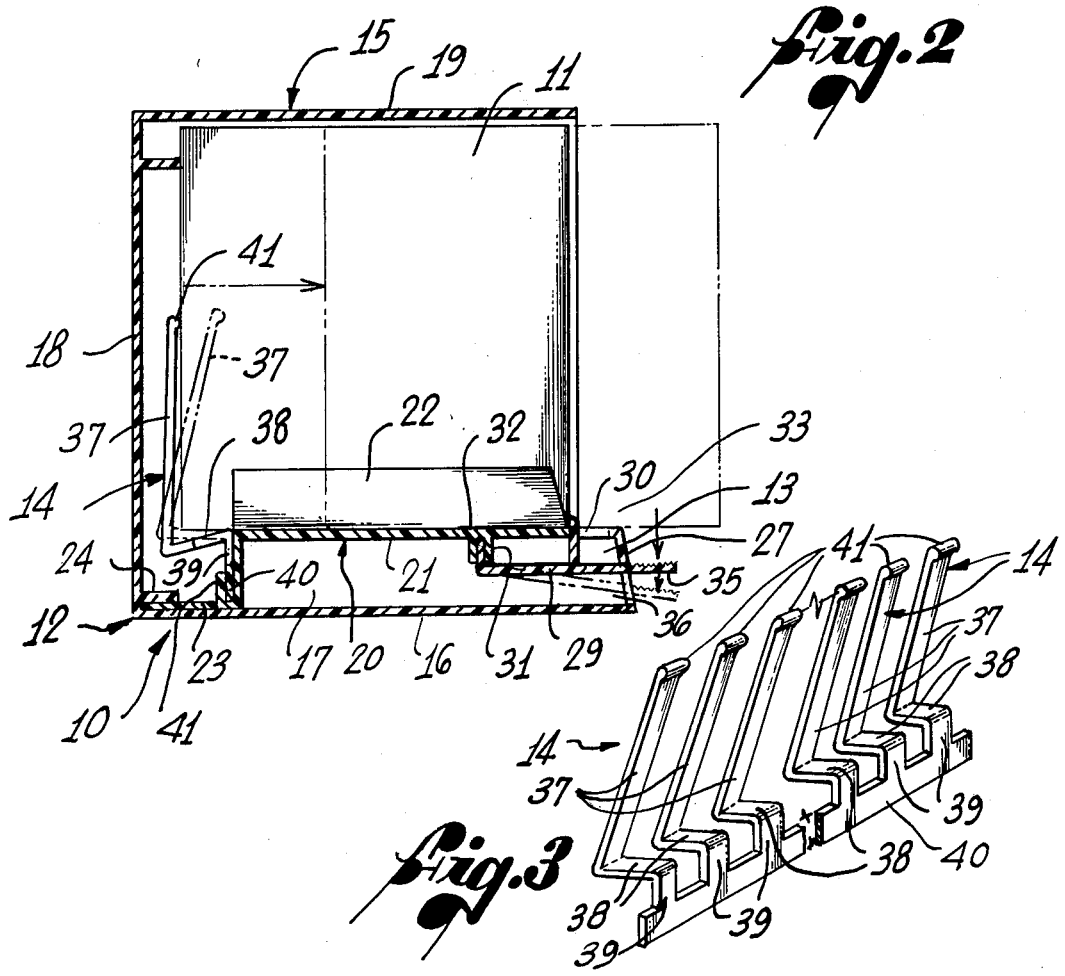

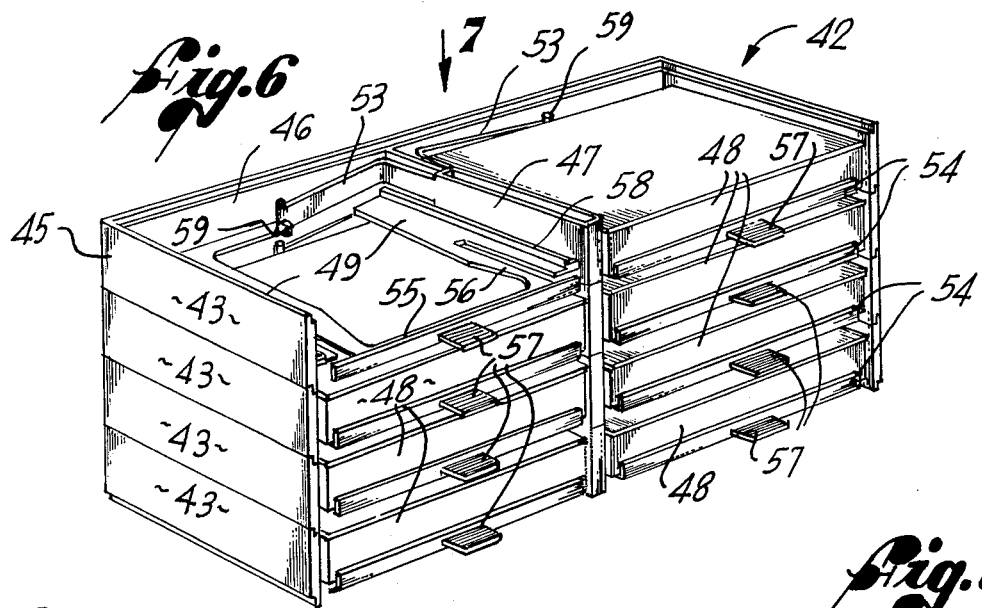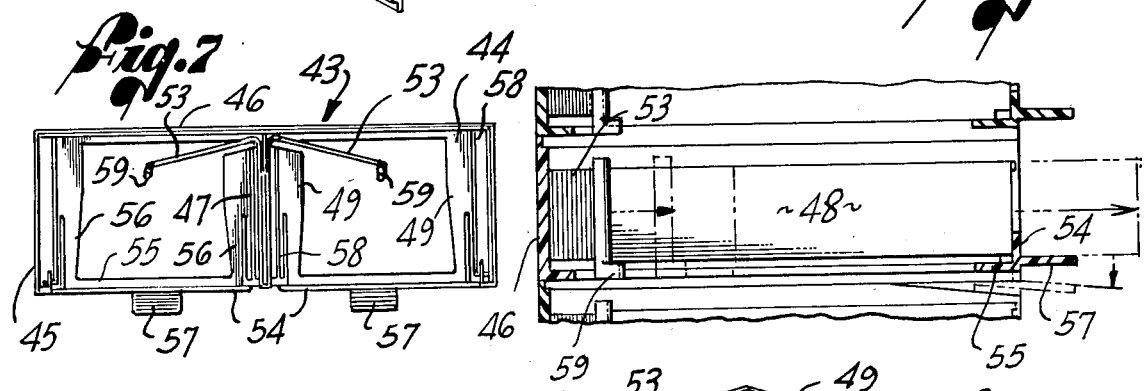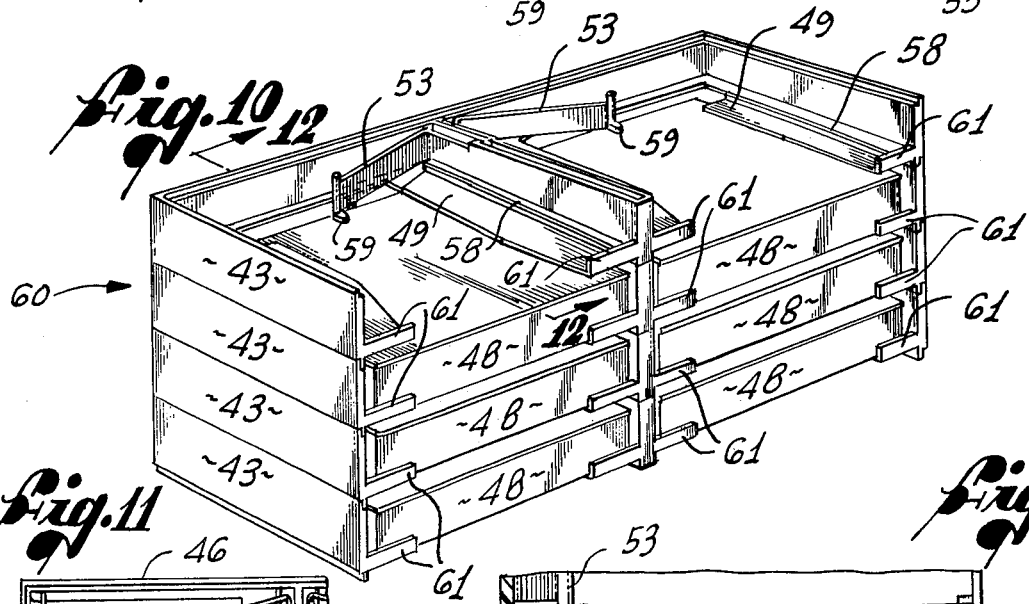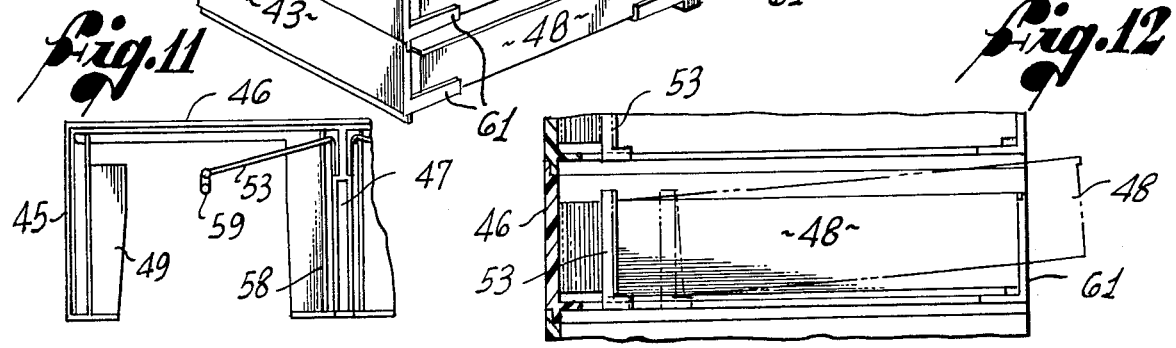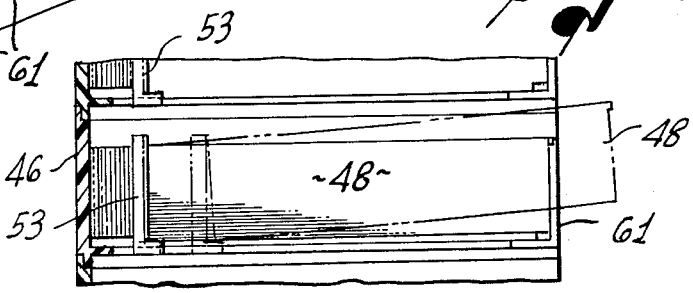

CASSETTE STORAGE AND DISPENSING DEVICE

BACKGROUND OF THE INVENTION

The present invention relates to storage and dispensing cabinets for tape and film cassettes and similar articles, and more particularly to such cabinets provided with mechanisms for ejecting selected cassettes.

A variety of cabinets have been proposed for the storage of tape and film cassettes, exemplary cabinets being described in U.S. Pat. Nos. 3,866,990 and 3,969,007. The increasing number of cassettes in use has created a need to improve upon the construction of such cabinets to reduce their cost, while improving upon their operational features and reliability.

In general, previously known cabinets of the above type employ a series of open-ended parallel slots in which the cassettes are inserted. An ejector mechanism is provided which includes a tab or button at the front end of each slot by which a member at the rear of the slot is caused to push the cassette forward so that it can be grasped and removed manually. In some instances, a plurality of interconnected moving parts are used to form a separate ejector for each slot. In other devices, a flexible member extends beneath each slot and bends to eject the cassette when depressed. In each of these cabinet constructions, the ejector must extend from the front of the cabinet to the back.

An objective of this invention is to simplify the construction of the cabinet, reducing its assembly cost and minimizing the quantity of materials required, while providing a highly reliable cabinet and a simple, smooth functioning ejector mechanism.

SUMMARY OF THE INVENTION

The present invention resides in an improved storage and dispensing cabinet for tape and film cassettes and similar articles that is of simple and economical construction, eliminating the need for an ejector mechanism that extends from the front to the back of each slot. Each cassette can be retained at its front end by a resilient retention member that normally extends into the open end of a slot, but is bendable so as to be withdrawn from the path of the cassette being inserted or removed. At the rear of the slot is a resilient drive member that is biased for movement toward a relaxed position in which it projects into the slot extending toward the retention member. When a retention member is depressed to release a cassette, the coacting drive member springs forward and pushes the cassette partially out of the slot so that it can be readily grasped by the finger tips and completely removed.

According to a more detailed aspect of the invention, the retention members can be integrally formed with an attachment strip, preferably of molded plastic. The drive members, which may be elongated fingers of generally Z-shaped profile, can be similarly formed with another attachment strip, also of molded plastic. When installed in a housing, each set of coacting retention and drive members is separately actuable to eject a cassette from one of a plurality of parallel slots.

In one embodiment of the invention, the housing is advantageously formed as an enclosure that receives a separate base, the attachment strips being secured along opposite sides of the base. Preferably, the retention members are tabs that carry upstanding abutments that project through openings in the base. The free ends of the tabs form actuator portions exposed on the outside of the cabinet so that the retention members can be depressed to selectively release the cassettes for movement under the force of the drive members.

In another embodiment of the invention, each slot extends horizontally (to receive cassettes in a horizontal position) and the retention member includes a lip that extends along the bottom of an opening at the front of the slot to engage the cassette. The lip is supported by flexible members that extend along the bottom of the slot, permitting it to be moved downwardly to release the cassette by bending these support members. Alternatively, the retaining lip can be stationary, in which case the cassette is released by lifting it over the lip and permitting the drive member to push it forward.

In the embodiments in which the cassette is inserted horizontally, each slot can be provided with a floor having a raised portion that defines a recess in which an article smaller than the slot can be securely held. The slot itself can be dimensioned to receive a boxed cassette while the recess receives the cassette alone. The drive members are provided with small projections that engage unboxed cassettes received by the recesses but fit underneath boxed cassettes. Accordingly, the user of the device can store both boxed and unboxed cassettes in the same cabinet without modifying the cabinet in any way. The cabinet housing, the retention members and the drive members can all be integrally formed of a single piece of molded plastic for ease of manufacture and assembly.

Other features and advantages of the present invention will become apparent from the following detailed description, taken in conjunction with the accompanying drawings, which illustrate, by way of exmple, the principles of the invention.

BRIEF DESCRIPTION OF THE DRAWINGS

FIG. 1 is a perspective view of a storage and dispensing cabinet for tape and film cassettes and the like that embodies many novel features of the present invention;

FIG. 2 is an enlarged, cross-sectional view of the cabinet taken along the line 2—2 in FIG. 1;

FIG. 3 is an enlarged, fragmentary, perspective view of the drive members and associated attachment strip of the cabinet;

FIG. 6 is a perspective view of a second cassette cabinet that embodies novel features of the invention, one of the slots being empty to expose its interior structure;

FIG. 7 is a plan view, on a reduced scale, of one tray of the cabinet of FIG. 6, taken in the direction of the arrow 7;

FIG. 8 is an enlarged, fragmentary, cross-sectional view taken along the line 8—8 of FIG. 6, showing a cassette in a stored position in solid lines and in a partially ejected position in phantom lines;

FIG. 10 is a perspective view of a third cassette cabinet that embodies novel features of the invention, both slots of the top tray being empty;

FIG. 11 is a fragmentary view, on a reduced scale, of a tray, taken in the direction of the arrow 11; and FIG. 12 is an enlarged, fragmentary, cross-sectional view of the cabinet taken along the line 12—12 of FIG. 10.

DESCRIPTION OF THE PREFERRED EMBODIMENT

Figure 4:
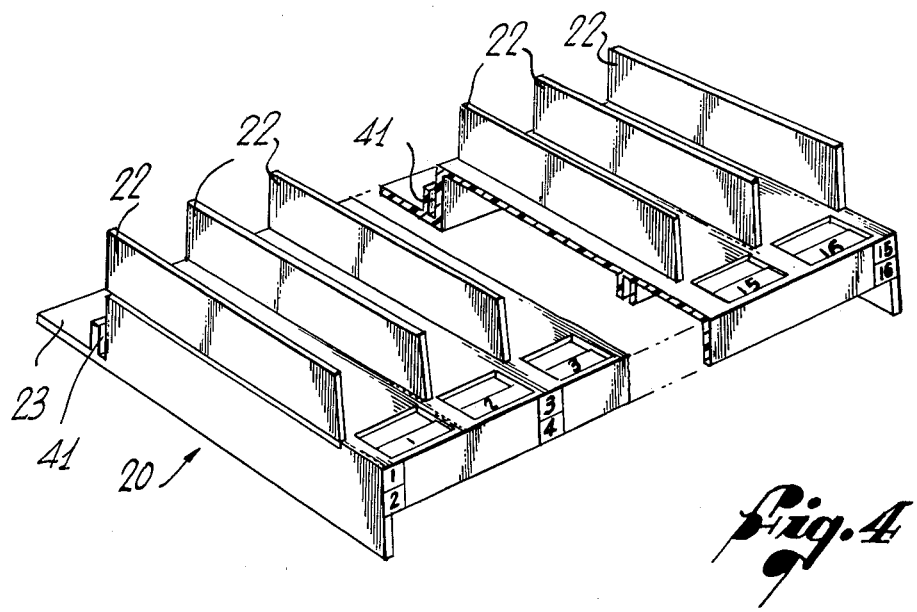
FIG. 4 is an enlarged, fragmentary, perspective view of the base of the cabinet.

A cabinet 10 (illustrated in FIGS. 1-5 of the accompanied drawings) provides for storage of microfilm cassettes 11 and other tape and film cassettes or similar articles in accordance with certain aspects of the present invention. In general, the cabinet 10 includes a housing 12 that defines a series of vertically oriented slots in which the cassettes 11 are stored, a plurality of retention members 13 for retaining the cassettes in the slots and a plurality of drive members 14 for pushing selectively released cassettes out of the slots.

The housing 12 includes a box-shaped, generally rectangular, molded plastic enclosure 15 having a horizontal floor 16, two vertical end walls 17, a back wall 18, and a horizontal roof 19, as shown in FIGS. 1 and 2. A base 20, that completes the housing, is best shown in FIGS. 2 and 4. It rests on the enclosure floor, extending from one end wall to the other, and provides a raised horizontal platform 21 extending longitudinally along the center of the enclosure 15 to support the cassettes 11 from beneath. A plurality of evenly spaced, short, parallel partitions 22 project vertically upwardly from the platform to divide the interior of the enclosure into the slots. The base is positioned and retained by a flat, horizontal foot 23 that extends rearwardly along the floor from the back of the platform into a groove 24 provided along the bottom edge of the back wall.

At the open front ends of the slots, numerical indicia 25 (shown in FIGS. 1 and 4) uniquely assigned to the slot with which they are associated are imprinted on the top surface of the platform 21. Corresponding indicia 26 (shown in FIG. 4 but omitted in FIG. 1) are imprinted on a strip-like front wall 27 of the base 20 that is slightly inclined backwardly toward the interior of the enclosure 15. Spaces 28 are provided adjacent these corresponding indicia for the display of information describing the particular cassettes 11 to be stored in the various slots.

Figure 5:
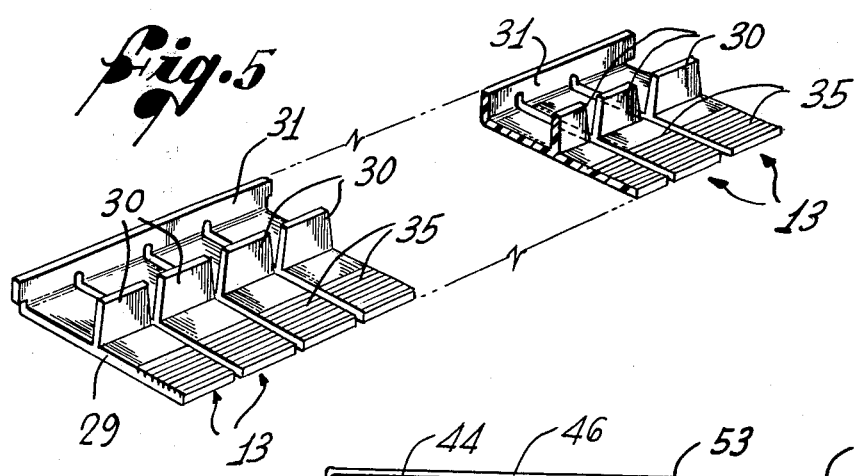
FIG. 5 is an enlarged, fragmentary view of the retention members and associated attachment strip of the cabinet.
Figure 9:
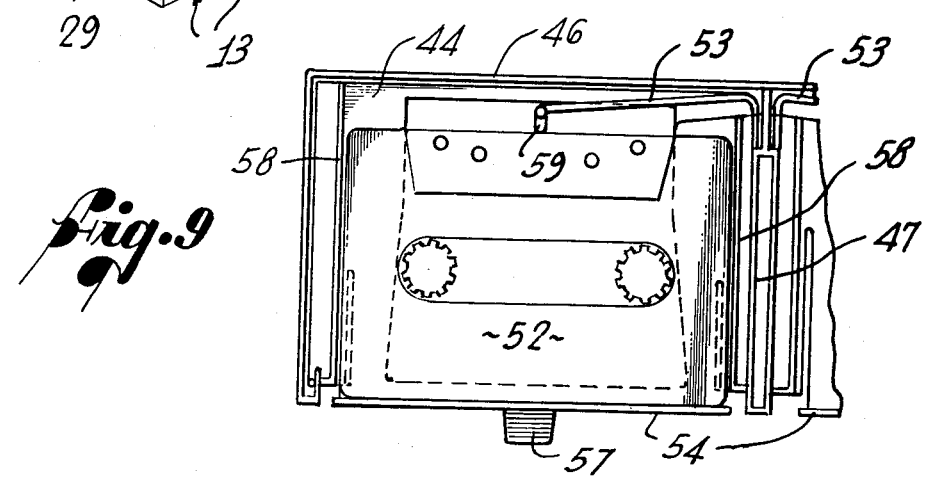
FIG. 9 is an enlarged, fragmentary, perspective view of a single tray containing an unboxed cassette.

The cassettes 11, which stand on end, are held in the slots by the retention members 13 which include rectangular tabs 29 that carry upstanding abutments 30. Each tab is joined at its back end to a first elongated, flat attachment strip 31 perpendicular to the top surface of the tab, as best shown in FIG. 5. The retention members are secured to the base 20 by inserting the top edge of the attachment strip into a downwardly facing groove 32 formed on the underside of the platform so that the strip is vertical and the tabs, in their normal, relaxed, i.e., unflexed position, extend horizontally, side by side, along the front side 33 of the base. With the tabs in this retaining position, the abutments project upwardly through openings 34 in the platform 21 (as best shown in FIG. 4) to engage the leading edges of the cassettes at the open front ends of the slots.

Actuator portions 35 on the free ends of the tabs 29 extend forwardly through openings 36 between the front wall 27 of the base 20 and the enclosure floor 16, as best shown in FIG. 2. Since the actuator portions 35 are exposed on the outside of the cabinet 10, the individual retention members 13 can be displaced downwardly by depressing a selected actuator portion with the tip of one's finger, causing the abutment 30 to be withdrawn through its associated opening 34 and disengage the leading edge of the cassette 11.

The drive members 14 are of a generally Z-shaped profile, each consisting of an elongated finger 37 with a relatively short connecting section 38 at its lower end and a shorter joining section 39 that extends from the connecting section (FIGS. 2 and 3). With the drive members in their relaxed positions, the connecting sections form acute angles with the finger and the joining sections form right angles with the connecting sections.

The bottom ends of the joining sections 39 merge with a flat elongated second attachment strip 40, similar to the first attachment strip 31 of the retention members 13, the drive members 14 and their associated strip being integrally formed as a single piece of resilient molded plastic, best shown in FIG. 3. When the drive members are installed in the cabinet 10, the lower edge of the second attachment strip 40 is inserted in an upwardly facing groove 41 formed in the base 20 along the back of the platform 21 so that the drive members are arranged along the side of the platform opposite the retention members 13. With the drive members in their normal, relaxed positions, the connection sections 38 extend rearwardly in the same plane as the horizontal top surface of the platform 21, and the drive fingers 37 are inclined forwardly from the vertical into the slots (as shown in phantom lines in FIG. 2).

When it is desired to insert a cassette 11 in one of the slots, the appropriate retention member 13 is depressed so that its abutment 30 is withdrawn from the slot. The cassette is then slid into the slot through its open front end to rest on the platform 21, the slot being dimensioned to snugly receive the cassette without interference or excessive friction. As the cassette reaches its fully inserted position, its back edge presses against a small bead 41 on the top end of the drive finger 37. Once the cassette is completely inserted so that the abutment 30 can snap up to partially block the front end of the slot, the drive finger will have reached a substantially vertical position (as shown in solid lines in FIG. 2). The cassette is then securely held between the drive member 14 and the retention member 13. It cannot fall out of its slot, regardless of the orientation of the cabinet 10.

To remove the cassette 11, the appropriate retention member 13 is again depressed. The drive member 14, being biased toward a relaxed position in which its drive finger 37 projects into the slot, springs forward and pushes the cassette partially out of the slot so that it can be grasped by its leading edge and withdrawn. The retention members and the drive members thus cooperate to form an ejector mechanism for selectively ejecting the cassettes.

It will be noted that the cabinet 10 need have only four separate parts, each of which is readily manufactured from plastic. It is not necessary to align or assemble a separate ejector mechanism for each slot because all ejector components are properly positioned once the two attachment strips 31 and 40 are installed. Since the coacting retention members 13 and drive members 14 do not directly engage each other, the dimensions and alignment of these members are not critical.

Other aspects of the present invention are embodied in a cabinet 42, illustrated in FIGS. 6-9. In general, the cabinet is of modular construction being formed by a vertical stack of relatively flat interlocking trays 43. Each tray defines the floor 44 and three sides, 45, 46 and 47, of two adjacent horizontally extending slots, while the floor of the tray above provides the top for the slots below. The slots are open at their front ends and dimensioned to receive cassettes 48 lying on their sides rather than standing on end as in the cabinet 10 of FIGS. 1-5.

The floor 44 of each slot consists of two generally flat strips 49 that extend rearwardly from the front (as best shown in FIGS. 6 and 7). At the rear of the slot a resilient drive arm 53 is held against the back wall 46 by the cassette 48 (as shown in solid lines in FIG. 8) but tends to spring forward, pushing the cassette partially out of the cabinet 42 (as shown in phantom lines in FIG. 8) so that it can be removed. When restrained by the cassette, the arm forms an L-shape, extending around the side of the cassette where it is joined to the side 47 at the center of the tray 43. This L-shape of the arm gives it the required snap and resiliency.

A narrow lip 54 extends across the front of the slot to retain the cassette 48 against the force of the arm 53. The lip 54 is mounted on a flange 55 tucked under the front edge of the cassette 48 and joined at its ends to two flat narrow support members 56 extending rearwardly (perpendicular to the lip) along the bottom of the cassette. The opposite ends of the support members are joined to the strips 49 that form the floor 44.

To release the cassette 48, it is merely necessary to depress a small actuator tab 57 that extends outwardly from the center of the lip 54 causing the support members 56 to bend downwardly until the lip drops below the cassette. The drive arm 53 can then push the cassette forward with a short positive stroke so that it can be grasped by the fingertips. It is not necessary for the action of depressing the actuator to supply the energy to eject the cassette, this energy having been provided when the cassette was inserted and having since been stored by the arm.

A unique feature of the cabinate 42 is that either the boxed cassette 48 (FIG. 8) or an unboxed cassette 52 (FIG. 9) is snuggly received without any modification of the trays 43. The unboxed cassette fits between two raised ribs 58 that are set inwardly from the opposite sides 45 and 46 on the floor 44. It is engaged from behind by a small projection 59 that extends forwardly from the bottom of the outer end of the arm 53.

The large boxed cassette 48 rides on top of the ribs and fills the entire slot from side to side. It also extends farther back into the slot, but it does not push the arm 53 back farther because it passes over the tab 59 to engage the end of the arm directly. Accordingly, the force exerted by the arm remains the same regardless of whether a boxed or unboxed cassette is used.

An important advantage of the cabinet 42 is that each module or tray 43 is integrally formed as one plastic piece that includes the drive arms 53 and the retention lips 54 as well as the housing that defines the slots. The one-piece construction of each tray not only reduces the cost of fabricating components, but it greatly reduces the cost of assembly.

A simplified embodiment of the invention is shown in FIGS. 10-12. This cabinet 60 is generally similar to the cabinet 42 of FIGS. 6-9 except that the movable retention lip 54 and its supporting members 56 are omitted (similar reference numbers being used to designate similar components).

All that is necessary to release a cassette 48 or 52 is to press one finger gently against the cassette, pushing it slightly back into the slot and lifting it over a pair of stationary retention lips 61 at the front of the slot near the sides. Alternatively, it is possible to push the finger slightly under the cassette since the entire center of the floor 44 between the two retention lips is open. There is enough space between the top of the cassette and the top of the slot to allow the cassette to pass over the lips 61 as it is pushed forward by the resilient drive arm 53.

The simplicity of construction and ease of assembly of each of the cabinets 10, 42 and 58 will be readily appeciated. They have the important advantage of simplicty of construction and operation. Moreover, the action of the ejector mechanism is smooth and positive, since the force that moves a cassette 48 out of a slot need not be transmitted to the rear of the cabinet to operate the drive member 41 or 53.

While the invention has been described in connection with its preferred embodiments, it will be understood by those skilled in the art that modifications and changes can be made without departing from the spirit and scope of the invention as defined by the appended claims.

I claim:

1. A storage and dispensing cabinet for articles such as tape and film cassettes and the like comprising:

a box-like plastic enclosure having a floor, two end walls, a back wall and a top, and having an open front;

a plastic base disposed within said enclosure and mounted on said floor, said base including a raised platform to support said articles within said enclosure and, first and second grooves extending along opposite sides of said platform, a plurality of equally spaced partitions projecting upwardly from said base and dividing said enclosures into a plurality of open-ended slots each adapted to slidably receive one of said articles, a plurality of openings each adjacent said open end of said slots, and indicia imprinted thereon identifying said slots;

a first elongated attachment strip disposed within said first groove and secured to said base;

a plurality of retention members integrally formed with said first attachment strip as a single plastic piece, each of said retention members comprising a resilient tab extending substantially perpendicularly from said first attachment strip and an upstanding abutment formed on said tab, and extending upwardly through one of said openings to engage the leading edge of one of said articles, the fee ends of said tabs forming exposed actuator portions adjacent said indicia by which said tabs can be manually depressed to disengage said abutments from said articles;

a second elongated attachment strip disposed within said second groove and secured to said base; and a plurality of drive fingers of generally Z-shaped profile integrally formed with said second attachment strip as a single plastic piece, each of said drive fingers extending upwardly into one of said slots, said drive fingers being biased for movement toward relaxed positions in which they extend toward said retaining members to eject said articles from said slots upon selective release of said articles by said abutments.

2. A storage and dispensing cabinet for articles such as tape and film cassettes and the like comprising:

an enclosure having an open front;

a base disposed within said enclosure and including a platform to support said articles, a plurality of equally spaced parallel partitions projecting upwardly from said base and dividing said enclosure into a plurality of open-ended slots for slidably receiving said articles, and a plurality of openings each acjacent the open end of one of said slots;

a first elongated attachment strip secured to said base along one side thereof;

a plurality of retention members integrally formed with said first attachment strip, each of said retention members comprising a resilient tab extending from said first attachment strip and an upstanding abutment formed on said tab and extending upwardly through one of said openings to engage the leading edge of one of said articles, the free ends of said tabs forming exposed actuator portions by which said tabs can be manually depressed to disengage said abutments from said articles;

a second elongated attachment strip secured to said base along a side thereof opposite said first attachment strip; and a plurality of elongated resilient drive fingers integrally formed with said second attachment strip and extending into said slots, said drive fingers being biased for movement toward relaxed positions in which they extend toward said retention members to eject said articles from said slots upon selective release of said articles by movement of said abutments.

3. The storage and dispensing cabinet of claim 2 wherein said tabs are normally substantially perpendicular to said attachment strip.

4. The storage and dispensing cabinet of claim 2 wherein said drive fingers each have a generally Z-shaped profile.

5. The storage and dispensing cabinet of claim 2 wherein said enclosure includes a floor extending beneath said base.

6. A storage and dispensing cabinet for articles such as tape and film cassettes and the like comprising:

a housing forming a plurality of slots each having an open end for slidably receiving at least one of said articles;

ejector means for normally retaining said articles in said slots and for selectively ejecting said articles from said slots upon actuation thereof, said ejector means comprising a plurality of resilient retention members each normally retaining one of said articles in a corresponding one of said slots, said retention members being bendable to permit said articles to be ejected therefrom, a plurality of drive members each extending into one of said slots at a location spaced from a corresponding one of said retention members so that at least one of said articles can be stored between each of said drive members and its corresponding retention member, said drive members being resilient and biased for movement toward relaxed positions in which they extend toward said retention members to eject said articles from said slots;

a first elongated attachment strip by which said retention members are commonly secured to said housing, said retention members being integrally formed with said first attachment strip; and a second elongated attachment strip by which said drive members are commonly secured to said housing, said drive members being integrally formed with said second attachment strip.

7. The storage and dispensing cabinet of claim 6, wherein each of said retention members comprises:

a tab normally extending perpendicular to said first attachment strip, a free end of said tab forming an exposed actuator portion for manually depressing said retention member to release one of said articles; and an upstanding abutment formed on said tab to engage the leading edge of one of said articles when said tab is not depressed.

* * * * *